Patented Aug. 17, 1926.

1,596,622

UNITED STATES PATENT OFFICE.

WALTER A. PATRICK, OF BALTIMORE, MARYLAND, ASSIGNOR, BY MESNE ASSIGNMENTS, TO THE SILICA GEL CORPORATION, OF BALTIMORE, MARYLAND, A CORPORATION OF MARYLAND.

STABILIZER FOR NITRATED ORGANIC COMPOUNDS.

No Drawing.   Application filed February 18, 1921. Serial No. 446,109.

The present invention relates to nitrated organic compounds. It is well known that the stability of such compounds is reduced by the presence of oxides of nitrogen. This fact has led to the addition of certain substances to the compounds, the function of which is to remove the oxides of nitrogen by chemical combination. Such substances are known as stabilizers, examples of which are urea and diphenylamine, these two being organic stabilizers. Inorganic substances have also been used for this purpose, such as calcium carbonate, magnesium carbonate and ammonium carbonate.

It has been found that the rate at which the oxides of nitrogen are given off from the compounds is accelerated by the presence of oxides of nitrogen. In other words, oxides of nitrogen have a catalytic action; the greater the quantity of free oxides present the greater the rate at which they are given off by the compound itself.

It is the principal aim of the present invention to provide nitrated organic compounds with a stabilizer which will effect the retention of the harmful oxides of nitrogen and adsorb the same more rapidly than where chemical reaction is depended upon.

To this end the present invention consists in a nitrated organic compound including as a stabilizer, a highly porous adsorbent material such as silica gel described in my Patent 1,297,724 granted March 18, 1919. This material has pores of such a size as to adsorb water vapor to such an extent as to contain not less than 10% of water when in equilibrium with water vapor at 30° C. and a partial pressure of 22 mm. mercury, and retains its porous structure, even when finely divided, and is admirably suited for incorporation in nitrated organic compounds, and will remove any oxides of nitrogen that may be given off by the compound more rapidly and completely than where chemical reaction is relied upon for the purpose. Because of this rapid and complete adsorbing action, it follows that the rate of production of the oxides of nitrogen by reason of the decomposition of the compound will be decreased, so that less oxides of nitrogen will have to be taken care of in this connection than heretofore. A further defect of chemical stabilizers as compared with gels resides in the fact that after the exterior portions of a chemical stabilizer have reacted with the oxides of nitrogen, it takes longer for the oxides to penetrate the chemical to a point where it will react with the same and thus be removed.

As for the adsorbing material employed, it must be of such a character that it will quickly adsorb the oxides of nitrogen even at the highest temperatures to which the nitrated organic compound may be subjected in ordinary use or storage. Kieselguhr and such porous materials which have been used as fillers will not effect the result of the present invention, because the pores are too large to adsorb gases at ordinary temperatures. It is a prerequisite therefore that the adsorbing material have pores of a size that will adsorb the oxides of nitrogen. The adsorbing material should not have any injurious action on the compound in a chemical or other way. It is found that silica gel is especially adapted for the present invention, but it is to be distinctly understood that the invention is not limited to this particular porous material but includes other porous adsorbing substances which might be employed.

The present invention is adapted for use in connection with a great variety of organic nitro-compounds, such as nitro-glycerin, T. N. T. and nitrocellulose such as gun cotton and celluloid and the like.

The invention is particularly adaptable to dynamite. Heretofore dynamite has included in its composition in addition to the nitro compound and sorbent materials for chemically adsorbing the oxides of nitrogen given off, these materials being termed stabilizers. It may also include a substance such as anhydrous copper sulphate for the purpose of adsorbing any moisture. According to the present invention as applied to dynamite, the stabilizer heretofore used and the anhydrous copper sulphate are replaced by a porous adsorbing material capable of physically adsorbing the oxides of nitrogen given off and also any moisture.

At the present time the "dope" or sorbent of dynamite consists of a screened mixture in proper proportions of several of a great variety of materials such as dry and ground nitrate of soda, nitrate of ammonia, wood pulp, flour, starch, sulphur and chalk. The nitro-glycerin properly prepared is added to this "dope". In the application of my invention to dynamite, the adsorbing material such as silica gel in a pulverized condition might be mixed in with the materials used to make the "dope", or at any convenient stage of the process. It will be understood therefore that the dynamite of the present invention would consist of nitroglycerin, "dope", (or sorbent) and an adsorbing material such as silicia gel, this latter material taking the place of the usual stabilizer and also the usual moisture adsorbent.

Having thus described the invention what is claimed as new and desired to be secured by Letters Patent is:

1. A stabilized explosive including at least three ingredients as follows: an explosive organic nitro compound tending to decompose, the decomposition products of which may cause premature explosion, a sorbent for such nitro compound, and a solid adsorbent stabilizer to adsorb such decomposition products, such adsorbent stabilizer having pores of such a size as to adsorb water vapor to such an extent as to contain not less than 10% of water when in equilibrium with water vapor at 30° C. and a partial pressure of 22 mm. of mercury.

2. A stabilized explosive including at least three ingredients as follows: an explosive organic nitro compound tending to decompose, the decomposition products of which may cause premature explosion, a sorbent for such nitro compound, and a solid adsorbent silica gel stabilizer to adsorb composition products, such adsorbent stabilizer having pores of such size as to adsorb water vapor to such an extent as to contain not less than 10% of water when in equilibrium with water vapor at 30° C. and a partial pressure of 22 mm. of mercury.

3. A stabilized explosive, including at least three ingredients as follows: an explosive organic nitro compound tending to decompose, the decomposition products of which may cause premature explosion, a sorbent for such nitro compound, and a solid adsorbent silicia gel stabilizer to adsorb such decomposition products, such adsorbent stabilizer having pores of such a size as to adsorb water vapor to such an extent as to contain not less than 10% water when in equilibrium with water vapor at 30° C. and a partial pressure of 22 mm. of mercury.

In testimony whereof I hereunto affix my signature.

WALTER ALBERT PATRICK